United States Patent
Kühne

(10) Patent No.: US 8,006,031 B2
(45) Date of Patent: Aug. 23, 2011

(54) MEMORY SYSTEM WITH SECTOR BUFFERS

(75) Inventor: Reinhard Kühne, Reichenau (DE)

(73) Assignee: Hyperstone GmbH, Konstanz (DE)

(*) Notice: Subject to any disclaimer, the term of this patent is extended or adjusted under 35 U.S.C. 154(b) by 842 days.

(21) Appl. No.: 11/720,411

(22) PCT Filed: Nov. 30, 2005

(86) PCT No.: PCT/EP2005/056354
§ 371 (c)(1),
(2), (4) Date: Mar. 3, 2008

(87) PCT Pub. No.: WO2006/058892
PCT Pub. Date: Jun. 8, 2006

(65) Prior Publication Data
US 2009/0049266 A1    Feb. 19, 2009

(30) Foreign Application Priority Data

Dec. 4, 2004  (DE) .................. 10 2004 058 528

(51) Int. Cl.
*G06F 12/00* (2006.01)
(52) U.S. Cl. .................. 711/103; 711/102
(58) Field of Classification Search .................. 711/103
See application file for complete search history.

(56) References Cited

U.S. PATENT DOCUMENTS

| | | | | |
|---|---|---|---|---|
| 5,630,093 A * | 5/1997 | Holzhammer et al. | ....... | 711/115 |
| 5,822,251 A * | 10/1998 | Bruce et al. | ....... | 365/185.33 |
| 6,421,274 B1 | 7/2002 | Yoshimura | | |
| 6,643,730 B2 * | 11/2003 | Okumura et al. | ....... | 711/5 |
| 6,778,436 B2 * | 8/2004 | Piau et al. | ....... | 365/185.03 |
| 2002/0097594 A1 * | 7/2002 | Bruce et al. | ....... | 365/49 |
| 2002/0124129 A1 | 9/2002 | Zilberman | | |
| 2004/0049627 A1 * | 3/2004 | Piau et al. | ....... | 711/103 |
| 2010/0054069 A1 * | 3/2010 | Shiota et al. | ....... | 365/220 |

FOREIGN PATENT DOCUMENTS
EP    0550241 A1    7/1993

* cited by examiner

*Primary Examiner* — Tuan V Thai
*Assistant Examiner* — Ngoc V Dinh
(74) *Attorney, Agent, or Firm* — Browdy and Neimark, PLLC

(57) ABSTRACT

The invention relates to a memory system which is connected to a host system by means of a host bus (HB). Said system contains a memory controller (FC) having an internal memory (IR) and flash memory chips (F1 . . . Fn) which are organised in individually deletable memory blocks. Said blocks contain a plurality of writeable and readable memory sectors, and the sectors are divided into sector sections which are secured by an ECC-word. The sectors are temporarily stored in the alternating sector buffers (SB1, SB2) in order to communicate with the host system and are transmitted between the sector buffers (SB1, SB2) and the flash memory chips (F1 . . . Fn), by means of a direct-flash-access-unit (DFA), without having to be temporarily stored in the internal memory (IR) of the memory controller (FC).

19 Claims, 4 Drawing Sheets

MEMORY SYSTEM WITH SECTOR BUFFERS

The invention describes a memory system for the reading and writing of logical sectors, which is connected to a host system by means of a host bus, and contains a memory controller having an internal memory and flash memory chips, which are organized in individually deletable memory blocks, said blocks containing a plurality of writeable and readable memory sectors for the storage of logical sectors.

The widely used nonvolatile semiconductor memories (flash memories) are organized in blocks and these in turn in sectors, with a block consisting e.g., of 256 sectors with 512 bytes each. The memories have the property that new information can be written only sectorwise to previously deleted sectors. The deletion is done in each case for one block for all sectors at once. Writing a sector to the memory takes longer than reading it, and a deletion operation of a block requires a long time, e.g. several milliseconds.

The hitherto existing memory systems are organized in such a way that the data of the host bus arrive at the flash memory chips via the memory controller and the memory bus. This configuration is sufficient for devices with a slow host bus, like Compact Flash and SD/MMC. The memory controller has adequate time to edit the data for storage without having to temporarily store the entire sector in the internal RAM. With a faster host bus, like USB2.0 or Serial ATA, this time is not available and the memory system becomes too slow.

It is the object of the invention to indicate a memory system that works sufficiently fast also with a fast host bus.

This object is met in such a way that, in order to communicate with the host system, the logical sectors are temporarily stored in at least one pair of alternating sector buffers, and are directly transmitted, by means of at least one direct-flash-access-unit, between the sector buffers and the flash memory chips without having to be temporarily stored in the internal memory (IR) of the memory controller (FC).

Advantageous embodiments are specified in the sub-claims.

The memory system is provided with sector buffers, which can temporarily store one logical sector each. A sector buffer is connected to the host bus to exchange data with the host, and a sector buffer is connected with the internal memory bus, to which the flash memory chip for the respective sector is attached. Thus, while a sector is transferred to the flash memory chips, another sector can be transferred from the host. The transmission from the host bus is thereby decoupled from the transmission to the flash memory chips. Both transmissions can take place with the respective maximum bus speed, and a temporary storage of the respective logical sector in the internal memory of the memory controller is not necessary.

In larger memory systems several memory buses are provided, to which one or more flash memory chips are attached respectively. These memory buses can be operated simultaneously. A pair of sector buffers is assigned to each memory bus. The connection of the respective memory bus to a pair of sector buffers is made by a matrix switch, so this allocation can be rearranged even during operation. The allocation of the sector buffers to the host bus is made by an input multiplexer.

A direct-flash-access-unit is assigned to each memory bus, which controls the transmission of the informative data from the respective sector buffer to the flash memory chips, by generating the necessary control signals and control instructions. The direct-flash-access-unit generates the switching signals for the multiplexers of the sector buffers and for the matrix switch, in order to make the connection between a sector buffer and the assigned memory chip.

During the writing procedure, after the transmission of a sector from the sector buffer to the memory chip, the now empty sector buffer is connected with the host bus, and the sector buffer, which has been filled by the host bus in the meantime, is switched to the memory chip, in order to write the next sector to the flash memory.

During the reading procedure, this operation of the alternating allocation of the sector buffers to both host bus and memory bus takes place accordingly.

Instead of the transmission of a sector from and to the memory chip, also a transmission from and to the memory controller can take place. This is mainly the case, when the sectors contain administrative data.

The setting of the multiplexers and of the matrix switch is initialized by the memory controller, and afterwards the switching operations are carried out by the direct-flash-access-unit, which is assigned to the memory bus.

The memory controller has access to the memory buses and can thus also directly access the memory chips. Likewise the memory controller can also directly access the contents of the sector buffers.

Modern flash memory chips have an internal page buffer, in which several sectors for writing or reading are temporarily stored all together. The memory functions are then run from this page buffer inside the same chip. If errors occur during a memory operation, the contents of this internal page buffer are destroyed. In an embodiment of the invention now at least one separate page buffer is assigned to each direct-flash-access-unit at the memory bus, said page buffer being filled by the associated sector buffer, and its contents being transferred to the internal page buffer of the flash memory chips. If now errors occur during a memory operation, the internal page buffer is again filled by the page buffer at the memory bus, in which sector contents have remained. Several page buffers per memory bus are applied, in order to simultaneously accomplish memory operations in several memory chips (interleaving). A further advantage of the page buffers resides in the fact, that only at the end of the transmission of an entire page, therefore of a multiplicity of sectors, an interrupt is tripped by the direct-flash-access-unit at the memory controller. This accelerates the transmission, since an interrupt is not tripped for each sector, which would require working time in the memory controller.

The multiplexers and the direct-flash-access-units are switchable in such a way, that six different directions of transmission can be set:
1: host <-> memory, 2: host <-> page buffer+memory, 3: page buffer <-> memory, 4: memory <-> host, 5: memory <-> host+page buffer, 6: memory <-> page buffer. Advantageously, an ECC unit is assigned to each direct-flash-access-unit, in which, simultaneously to the transmission of the sectors, check words are formed for writing to the memory chips, and appended to the sectors.

During the reading of the sectors, the check words in the ECC unit are examined simultaneously to the transmission, and if necessary an error is indicated.

A further security feature is advantageously provided by a CRC unit, which is also assigned to each direct-flash-access-unit. A CRC word is formed over each sector and examined respectively. Thus an attempt of correction through the ECC word is avoided, if sectors are strongly erroneous, e.g. in the case of a current failure during a memory operation.

The memory controller controls the direct-flash-access-units by means of one pair of register records each, which are switched, similar to the sector buffers, by multiplexers in a manner alternating between the memory controller and the respective direct-flash-access-unit. Said register records contain the parameters such as addresses, lengths and check characters, with which the data transmission is carried out.

An instruction for a memory operation is stored in one set of the control registers by the memory controller. Afterwards the register records are switched, and the respective direct-flash-access-unit executes this instruction, while the memory controller writes the next instruction to the other register record. As soon as the first instruction is executed and the next instruction is stored in the other register record, the register records are again changed. The instructions can be used for controlling and querying the flash memory chips, as for instance deletion and deletion progress respectively, or for the transmission of sectors.

For the transmission of sectors the respectively following instruction is sent from the register record to the associated flash memory chip, and the transmission of the respective sector is executed. Up-to-date flash memory chips come with page buffers integrated, in which a certain number of sectors for writing and reading are temporarily stored. The transmission takes place until the respective page buffer is filled with sectors or emptied. Each sector is secured by an ECC word. The transmission of the sectors between the sector buffers and the page buffers is done with simultaneously computation and examination of the respective ECC word in the associated ECC unit. Thus a stoppage on the memory bus during the computation of the ECC word is avoided. After the transmission of a sector, the ECC unit appends an ECC word or corrects the sector in the case of an error.

In addition to the transmission of informative data from the sector buffers to the flash memory chips, it is of course also envisioned to transfer administrative data directly between the memory controller and the flash memory chips, without making use of the direct-flash-access-unit.

The embodiment of the invention is described in the figures by way of example.

Figure 1:
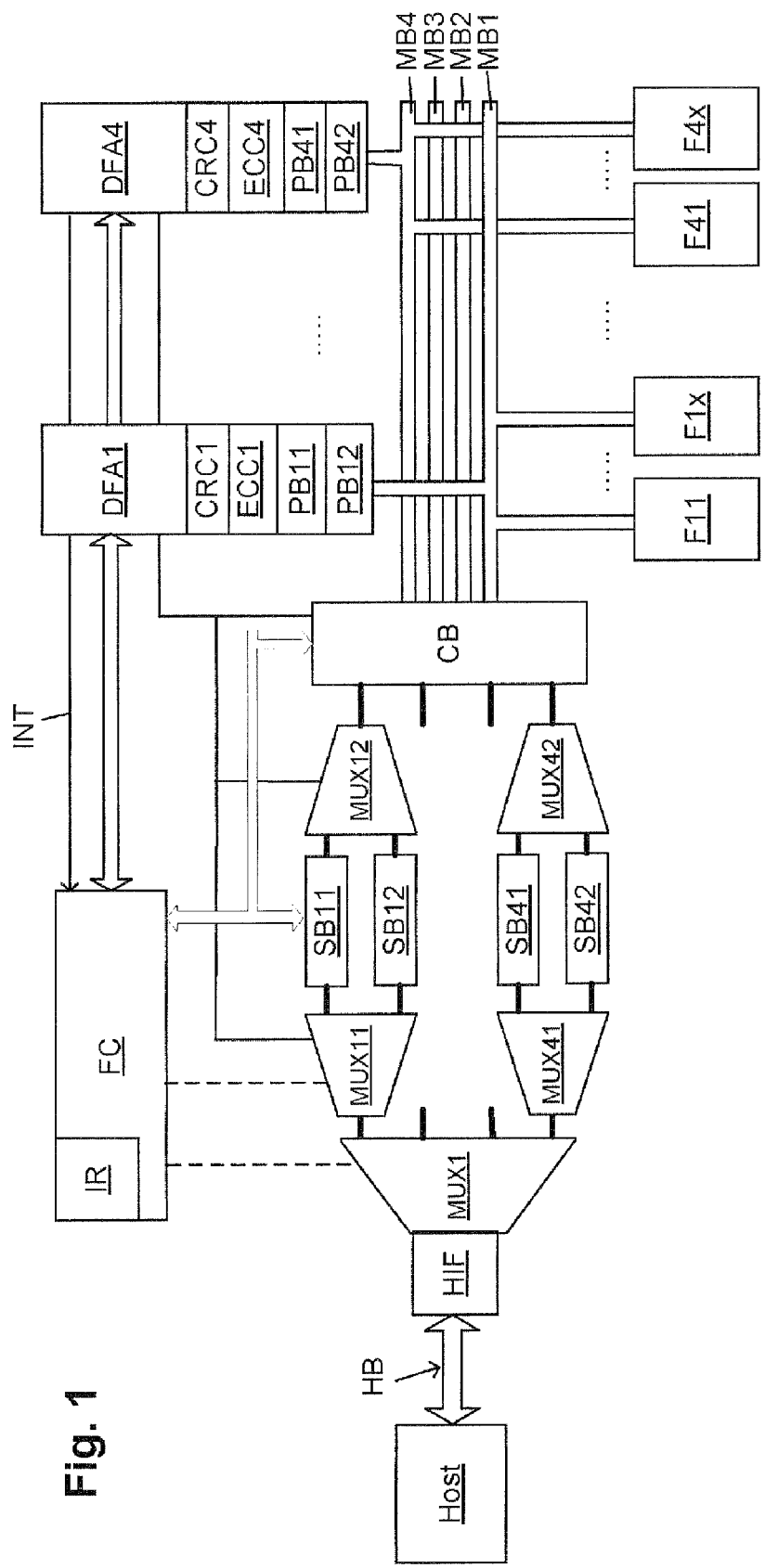
FIG. 1 shows a block diagram of the memory system
Figure 4:
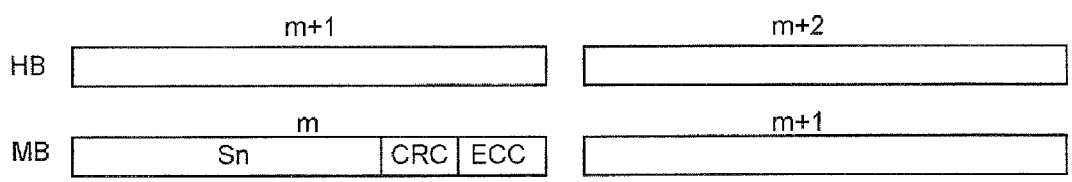
Figure 5:
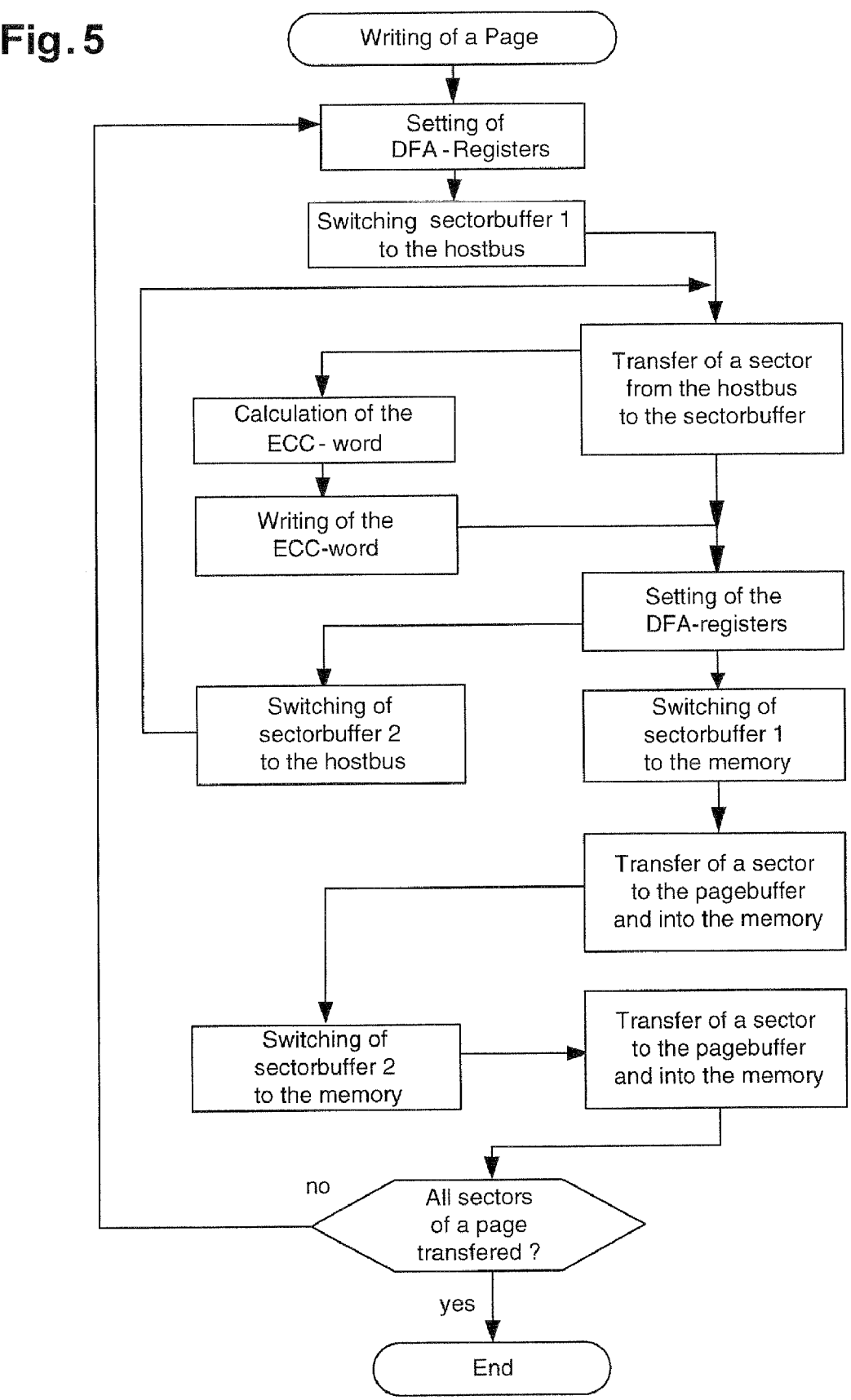
Figure 6:
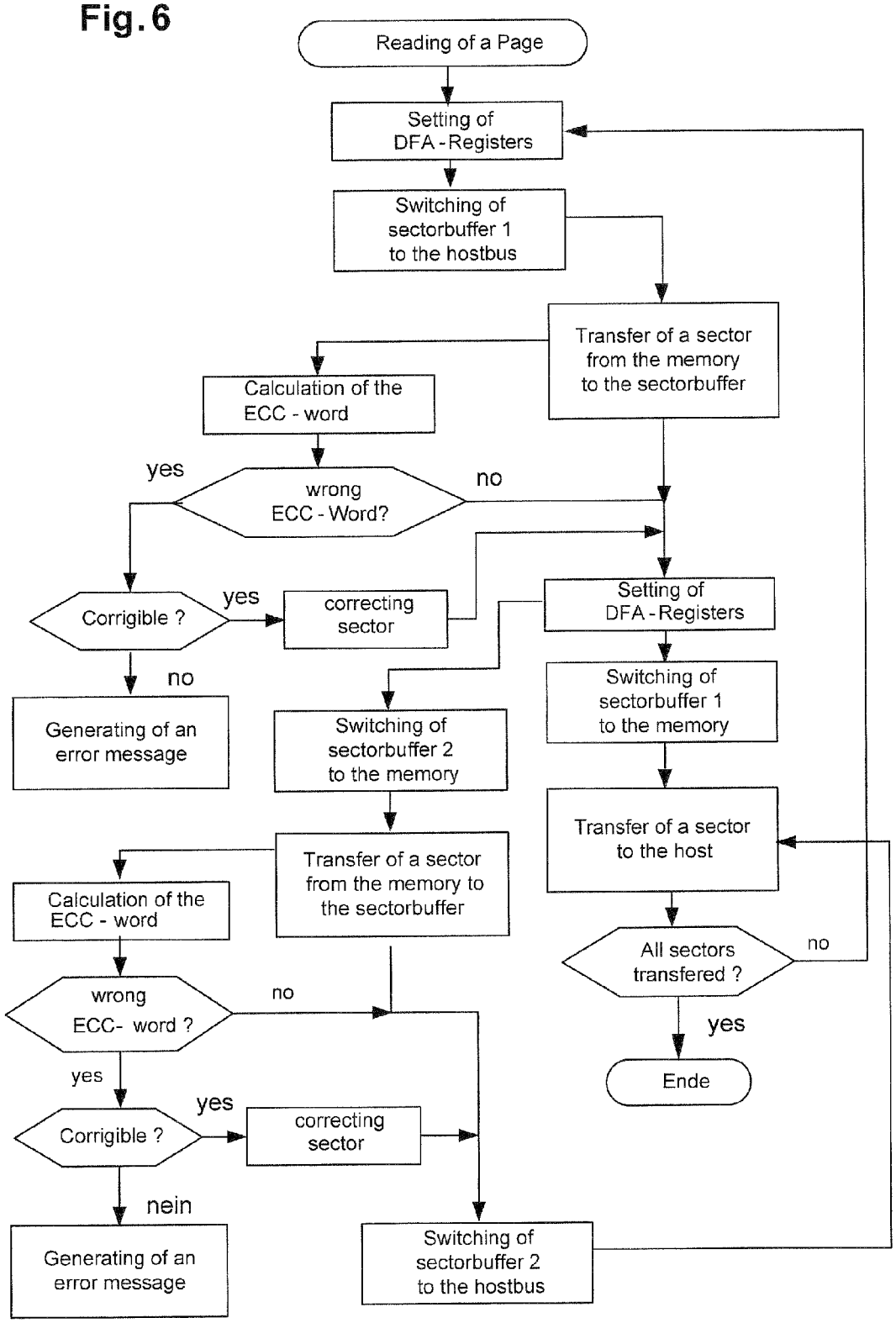

FIG. 4 shows the transmission of the logical sectors over the host bus and memory bus FIG. 5 shows a flow chart for the writing of a page FIG. 6 shows a flow chart for the reading of a page In FIG. 1 the block diagram of a memory system with the memory controller FC and the flash memory chips F11 . . . F4$x$ is shown. In the version displayed here the memory system is equipped with four groups of memory chips at four memory buses MB1 . . . MB4. A direct-flash-access-unit DFA1 . . . DFA4 is assigned to each memory bus MB1 . . . MB4. In this case two page buffers PBn 1,2 respectively, one ECC unit ECCn, and one CRC unit CRCn are associated with each direct-flash-access-unit.

The memory system is connected to a host by means of the host bus HB and a host inter-race HIF. According to the number of memory buses MB1 . . . MB4, sector buffers SBnl, SBn2 are provided, which are connected in an alternating manner to respectively one of the buses by the two multiplexers MUXn1 and MUXn2. In this way they decouple the host bus HB from the memory bus MB. The allocation of one pair of sector buffers to the host bus HB is made by the input multiplexer MUX1. The allocation of one pair of sector buffers to a memory bus MBn is made by the matrix switch CB.

The multiplexers MUX1, MXn1, MUXn2 and the matrix switch CB are initialized by the memory controller FC. Then the multiplexers are further controlled by the direct-flash-access-units DFAn.

The memory controller FC has access to the sector buffers SBn1. SBn2, to the memories Fnx via the matrix switch CB, and to the direct-flash-access-units DFAn. The data for the administration of the memory system are stored in the internal memory IR in the memory controller FC.

The direct-flash-access-units DFAn trip an interrupt at the memory controller FC via the interrupt line INT after each transmission of a sector or a page. The number of interrupts to be dealt with is minimized by the use of the page buffers.

Figure 2:
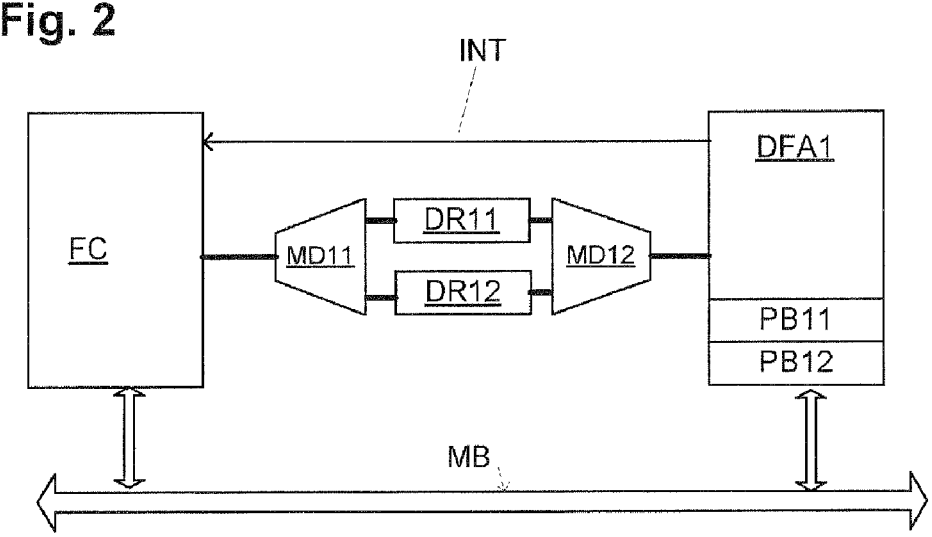
FIG. 2 shows a detail of the memory controller and command memory

FIG. 2 shows a somewhat more detailed view of the memory controller FC and a direct-flash-access-unit DFA1. Between the memory controller FC and the direct-flash-access-unit DFA1, two register records DR11, DR12 are located, which are assigned to the memory controller FC or the direct-flash-access-unit DFA in an alternating manner by the multiplexers MD11 and MD12. Said direct-flash-access-unit processes the order in one register record, while the other register record is charged with a further order by the memory controller. Such orders can also mean, to fill the page buffers PB11 or PB12 with data and write it then with the interleave procedure into the memory chips. Results of a memory operation are also transferred, in the register records DR11, DR12, to the memory controller FC. When an order is completed, an interrupt at the memory controller FC is tripped via the interrupt line INT.

Figure 3:
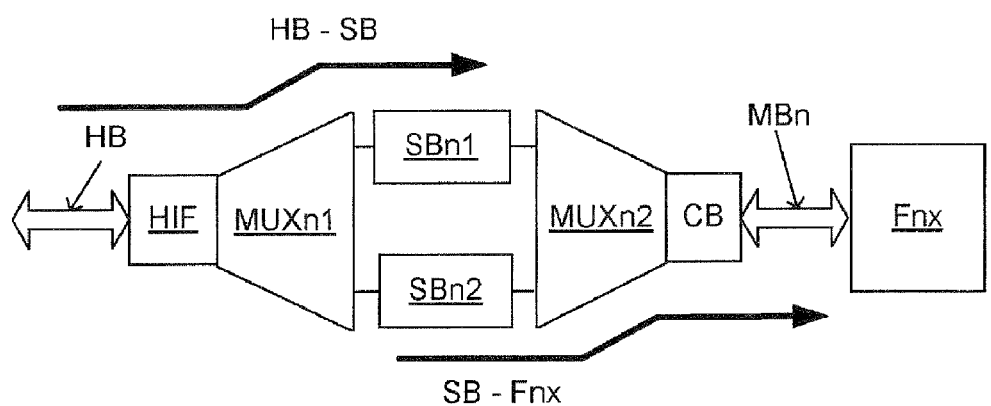
FIG. 3 shows the alternate switching of the sector buffers

FIG. 3 and FIG. 4 show the operation of the alternating sector buffers SBn1, SBn2. Here the sector buffer SBn1 is connected to the host bus HB by means of the host interface HIF and the first multiplexer MUXn1, while the sector buffer SBn2 is connected to the assigned memory bus MBn and the appropriate memory chips Fnx by means of the second multiplexer MUXn2 and the matrix switch CB. After each transmission of a sector the allocation of the sector buffers SBn1. SBn2 is changed by switching the multiplexers MUXn1, MUXn2. That way a sector m+1 is transferred by the host over the host bus HB to the sector buffer SBn1, while simultaneously a sector m is transferred from the sector buffer SBn2 to the memory chips Fnx. Subsequently, the sector m+1 is transferred from the sector buffer SBn1 over the memory bus MBn, while the sector m+2 is transferred over the host bus to the sector buffer SBn2. Furthermore it is shown here, that the CRC character and the FCC word are appended to the respective sector.

FIG. 5 shows the flow chart for the writing of a page in the memory chips Fnx. After the first setting of the DFA registers, the sector buffer 1 is connected to the host bus, and a sector is transferred over the host bus to the sector buffer 1. Simultaneously to this operation the FCC word is computed and, after the transmission, also registered in the sector buffer 1. After the transmission, the sector buffer 1 is connected to the memory via the multiplexers, and the transfer of the sector to the memory is begun. Simultaneously to this operation the sector buffer 2 is connected to the host bus, and the transfer of the next sector to the sector buffer 2 is begun. Now the transmissions of the first sector to the memory and of the second sector to the sector buffer 2 run simultaneously. When a sector is transferred to the memory, it is examined whether all sectors of a page have been transferred. If this is not the case, the other sectors are transferred over the host bus to the memory, as described above, with alternating use of the sector buffers 1 and 2.

FIG. 6 shows the flow chart for the reading of a page from the memory. After the first setting of the DFA registers, the sector buffer 1 is connected to the memory, and a sector is transferred from the memory to the sector buffer 1. Simultaneously to this operation the ECC word is computed and, after the transmission, examined for errors. If the errors are correctable, the sector is corrected in the sector buffer; otherwise an error message is produced and stored in the sector buffer. Now, if there is a sector without errors in the sector buffer, the sector buffer 1 is connected to the host bus via the multiplexers, and the transfer of the sector to the host is begun. Simultaneously to this operation the sector buffer 2 is connected to the memory, and the transfer of the next sector from the memory to the sector buffer 2 is begun. Also this time the ECC word is examined simultaneously. If the errors are correctable, the sector is corrected in the sector buffer; otherwise an error message is produced and stored in the sector buffer. Now, if there is a sector without errors in the sector buffer, the sector buffer 2 is connected to the host bus via the multiplexers, and the transfer of the sector to the host is begun.

Now the transmissions of the first sector from the memory and of the second sector from the sector buffer 1 run simultaneously. When a sector is transferred to the lost, it is examined whether all sectors of a page have been transferred. If this is not the case, the other sectors are transferred from the memory to the host bus, as described above, with alternating use of the sector buffers 1 and 2.

REFERENCE SIGNS

CB—matrix switch
CRCn—CRC unit
DFAn—direct-flash-access-unit
DRn1,2—register record
EA—First Instruction
ECCn—ECC unit
Fnx—flash memory chips
FC—memory controller
HB—host bus
HIF—host interface
INT—interrupt line
IR—internal memory
MBn—memory bus
MDn1, 2—register record multiplexer
MUX1—input multiplexer
MUXnI—host-sided multiplexer
MUXn2—memory-sided multiplexer
PBn1,2—page buffer at memory bus
SB1, SB2—sector buffer

The invention claimed is:

1. Memory system for reading and writing logical sectors, which is attached to a host system by means of a host bus (HB), and which contains a memory controller (FC) having an internal memory (IR) and flash memory chips (F1 . . . Fn), which are organized in individually deletable memory blocks, said blocks containing a plurality of writeable and readable memory sectors for the storage of logical sectors, these logical sectors for communication with the host system being temporarily stored in a plurality of pairs of alternating sector buffers (SBn1, SBn2) and being transmitted directly, by means of at least one direct-flash-access-unit (DFAn), between the sector buffers (SB1n, SBn2) and the flash memory chips (F11 . . . Fnx), wherein the flash memory chips (Fxy) are connected by memory buses (MBn) to several pairs of sector buffers (SB1n, SBn2) via a matrix switch (CB), wherein the sector buffers are connected to the host bus (HB) by an input multiplexer (MUX1), characterized in that a memory bus (MBn) and a direct-flash-access-unit (DFAn) are assigned to each pair of sector buffers (SBn1, SBn2), and one sector buffer is assigned to the host bus (HB) the other sector buffer is assigned to the memory controller (FC) or to a memory bus (MBn) with a direct-flash-access-unit (DFAn), and that after each transmission of a sector the assignment of the sector buffers is switched.

2. Memory system according to claim 1, characterized in that the assignment of the sector buffers (SBn1, SBn2) via multiplexers (MUXn1, MUXn2) is initialized by the memory controller (FC) and is afterwards switched by the appropriate direct-flash-access-units.

3. Memory system according to claim 1, characterized in that the memory controller (FC) accesses the flash memory chips (Fn1 . . . Fnx), alternating with the respective direct-flash-access-unit (DFAn).

4. Memory system according to claim 1, characterized in that the memory controller (FC) directly reads or writes any storage location of the sector buffers (SB1, SB2) if necessary.

5. Memory system according to claim 1, characterized in that several logical sectors are combined into one page and the transmission of the sectors from and to the flash memory chips (Fn1 . . . Fnx) takes place via at least one page buffer (PBny), which is assigned to the respective direct-flash-access-unit (DFAn), and that the end of each transmission trips an interrupt at the memory controller (FC) via the appropriate direct-flash-access-unit (DFAn).

6. Memory system according to claim 5, characterized in that six different directions of transmission can be set by means of the respective multiplexers (MUXn 1,2) and the associated direct-flash-access-unit (DFAn):
   1: host to or from memory,
   2: host to or from page buffer and memory,
   3: page buffer to or from memory,
   4: memory to or from host,
   5: memory to or from host and page buffer,
   6: memory to or from page buffer.

7. Memory system according to claim 1, characterized in that the sectors are each secured in the flash memory chips by an ECC word, and computation or examination of the ECC word is done, simultaneously to the transmission of the sectors, in one ECC unit (ECCn) assigned to the respective direct-flash-access-unit (DFAn).

8. Memory system according to claim 7, characterized in that the direct-flash-access-unit (DFA) sends a next instruction from a connected register record (DRn 1,2) to the flash memory chips (Fn1 . . . Fnx) and executes the associated transmission of the logical sectors.

9. Memory system according to claim 1, characterized in that simultaneously to each ECC computation a CRC character is formed over the sector in an assigned CRC unit (CRCn).

10. Memory system according to claim 1, characterized in that the direct-flash-access-units (DFAn) are controlled by the memory controller (FC) by means of two register records (DRn 1,2).

11. Memory system according to claim 10, characterized in that the register records (DRn 1,2) are assigned to the memory controller (FC) or the respective direct-flash-access-unit via multiplexers (MFn 1,2) in an alternating manner.

12. Procedure for the writing of logical sectors from the host bus (HB) to the memory system according to claim 1, characterized in that
   the sector buffer (SBn1) is switched to reading by the host bus,
   the sector is transmitted from the host bus to the respective sector buffer (SBn1) by means of the direct-flash-access-unit (DFAn), a computation of an ECC word in an ECC unit (ECCn) is done simultaneously to the transmission of the sector from the host bus (HB) to the respective sector buffer (SBn1), the computed ECC word is inserted in the sector buffer (SBn1) behind the transferred sector, optionally an additional CRC character is formed in the CRC unit (CRCn) and appended to the sector, after the end of the transmission of the sector, the sector buffer (SBnI) is switched to transferring to the flash memory chips (Fnx), and the sector is transmitted to the flash memory chips (Fnx) by means of the direct-flash-access-unit (DFAn).

13. Procedure according to claim 12, characterized in that orders are positioned in register records associated with the respective direct-flash-access-unit (DFAn) in such a way that the transmissions between a sector buffer (SBn1) and the host bus (HB) as well as between the other sector buffer (SBn2) and the flash memory (Fnx) are done simultaneously.

14. Procedure according to claim 13 characterized in that commands are positioned in register records associated with the respective direct-flash-access-unit (DFAn) in such a way that the transmission between a sector buffer (SB11) and its assigned memory bus (MB1) is done simultaneously with the transmission between other sector buffers and their assigned memory buses.

15. Procedure according to claim 12 characterized in that commands are positioned in register records associated with the respective direct-flash-access-unit (DFAn) in such a way that the transmission between a sector buffer (SB11) and its assigned memory bus (MB1) is done simultaneously with the transmission between other sector buffers and their assigned memory buses.

16. Procedure for reading of logical sectors from a memory system to a host bus according to claim 1, characterized in that the sector buffer (SBn2) is switched to reading from the flash memory chips (Fnx), the sector is transmitted from the flash memory chips (Fnx) to the respective sector buffer (SBn2) by means of the direct-flash-access-unit (DFAn), an examination of an ECC word is done in an ECC unit (ECCn) simultaneously to the transmission of the sector to the sector buffer (SBn2), a computed ECC word is compared with the read ECC word in the sector buffer, optionally an additional CRC character is examined by a CRC unit (CRCn), in the case of a correctable error a value in the sector buffer (SBn2) is corrected, in the case of a non-correctable error an error message is stored in the sector buffer (SBn2), after the end of the transmission of the entire sector from the flash memory chips (Fnx) the sector buffer (SBn2) is switched to transferring to the host bus (HB), and the sector is transferred to the host bus (HB).

17. Procedure according to claim 16 characterized in that commands are positioned in register records associated with the respective direct-flash-access-unit (DFAn) in such a way that the transmission between a sector buffer (SB11) and its assigned memory bus (MB1) is done simultaneously with the transmission between other sector buffers and their assigned memory buses.

18. Procedure according to claim 16, characterized in that orders are positioned in register records associated with the respective direct-flash-access-unit (DFAn) in such a way that the transmissions between a sector buffer (SBn1) and the host bus (HB) as well as between the other sector buffer (SBn2) and the flash memory (Fnx) are done simultaneously.

19. Procedure according to claim 18 characterized in that commands are positioned in register records associated with the respective direct-flash-access-unit (DFAn) in such a way that the transmission between a sector buffer (SB11) and its assigned memory bus (MB1) is done simultaneously with the transmission between other sector buffers and their assigned memory buses.

* * * * *